United States Patent [19]
Henderson et al.

[11] 3,918,073
[45] Nov. 4, 1975

[54] GOLF TEACHING AID APPARATUS

[76] Inventors: James F. Henderson, 1013 E. 14;
Stephen D. Gaffaney, 1817 N. Cook,
both of Spokane, Wash. 99207

[22] Filed: Mar. 18, 1974

[21] Appl. No.: 452,437

[52] U.S. Cl. .................. 354/120; 352/46; 352/84
[51] Int. Cl.² .............................................. G03B 1/00
[58] Field of Search .............. 354/60, 88, 110, 120; 352/46, 84

[56] References Cited
UNITED STATES PATENTS

| | | | |
|---|---|---|---|
| 2,223,849 | 12/1940 | Fogler | 352/46 |
| 2,760,418 | 8/1956 | Hawn | 354/88 |
| 3,016,812 | 1/1962 | Chatlain | 354/110 |
| 3,173,348 | 3/1965 | Betinis | 352/84 |
| 3,202,069 | 8/1965 | Cummins | 354/120 |
| 3,820,133 | 6/1974 | Adorney | 354/60 |

*Primary Examiner*—John M. Horan
*Attorney, Agent, or Firm*—Wells, St. John & Roberts

[57] ABSTRACT

An apparatus is disclosed herein for enabling a golfer to analyze his own golf swing for the purpose of determining how he may improve his game. The apparatus is utilized to produce a teaching aid in the form of a permanent visual representation of the golfer, sequentially illustrating his entire golf swing through a series of "stop action" photographs produced on a single visual aid blank. The apparatus includes a platform for supporting the golfer and for angularly orienting him relative to a plurality of cameras held within an enclosure facing the platform. The apparatus also includes an automatic shutter operating means that initiates a timed release of a plurality of camera shutters as the golfer begins his backswing motion. An adjustment is provided that allows the golfer to selectively set the elapsed time of the exposure sequence to match his golf swing speed. During each operational cycle, mechanisms within the enclosure automatically feed a single visual aid blank to the cameras, release the blank after exposure to a developing tank, automatically develop the exposed blank, and present the finished visual aid to the golfer.

17 Claims, 14 Drawing Figures

GOLF TEACHING AID APPARATUS

BACKGROUND OF THE INVENTION

The present invention relates basically to golf training aids and more specifically to such training aids for use in analyzing a golfer's swing.

The proper method of addressing and striking a golf ball is relatively complex. Developing a correct swing involves conscientious effort by the golfer to hold and maintain certain desired positions of his limbs and torso throughout the entire swing. The proper club swing is not easily self-taught since the golfer is not usually able to detect weak points other than the very obvious. Thus, when a golfer desires to perfect his swing, he must utilize the services of a competant instructor. Both of these methods have drawbacks since over a time period of perhaps two seconds, the instructor must be able to detect and make mental notes of any one or more of a great number of common errors, such as improper weight distribution, wrong grip, improper stance, improper follow-through, improper wrist, shoulder, elbow, hip, or knee movement, poor timing and many others. Thus, it is easily understood that it is nearly impossible for an effective criticism or analysis of a golfer's swing to be arrived at simply from watching a golfer as he swings. The problem is often compounded since many of the errors commonly made may offset one another or may be a composition of several different errors which result in the same effect on the flight of the golf ball.

It is therefore a primary object of the present invention to provide a permanent record in the form of a visual aid, of a sequence of positions assumed by a golfer as he moves his golf club through a complete swing, including a back swing, down swing, and follow-through. By providing such a record, the golfer or instructor may analyze the various positions he assumes in the sequence and thereby determine primary weaknesses to be corrected.

Golf swing teaching aids are not new per se. For example, a U.S. Pat. No. 3,173,348 granted to E. J. Betinis discloses a golf swing recorder. The recorder utilizes an electric eye system which is activated to operate a camera for taking a single photograph of the golfer during a specific part of his swing. U.S. Pat. No. 3,601,408 describes a very complicated electronic system that attempts to calculate the trajectory of a golf club head as it passes through an electric eye system. This apparatus would be of use only to determine the proper angular relationship of the golf club face to the golf ball as the club head approaches the ball.

Another U.S. Pat. granted to J. B. Cummins et al., No. 3,302,069 discloses a sequence camera for producing a plurality of still photographs on a single sheet of film, the photographs being the result of sequential exposures of predetermined areas on the sheet. The camera is designed for use with high speed, self-developing film such as "Polaroid" film and must be operated by an individual other than the subject being photographed. The Cummins camera includes means for adjustably governing the shutter releasing means to vary the interval of time between exposures. This adjustment governs the time elapsed between each exposure and is operated by a single control. Therefore, although the overall elapsed time involved in the exposure sequence is adjustable, the time intervals between the exposures in sequence are not individually adjustable.

It is an important object of the present invention to provide a golf swing teaching aid apparatus that is completely self-contained and is operated to produce a sequence of reproductions of a golfer on a photo-sensitized visual aid blank, the sequence starting with the golfer's initial back swing, down swing, and follow-through.

Another object is to provide such an apparatus that is capable of utilizing low-cost photo sensitive visual aid blanks instead of expensive film.

It is another important object of the present invention to provide such an apparatus that includes individual control of the elapsed time between exposures, adjustable by the golfer to adapt the exposure sequence to the total approximate time of the golfer's complete swing.

It is a further object of the present invention to provide such as apparatus that is relatively simple in construction and therefore easy to operate and to maintain.

It is a yet further object of the present invention to provide such an apparatus that utilizies a developing system wherein the processing chemicals utilized for developing the visual aid are recycled after use to maintain a minimum processing expense and minimize the operating expense of the apparatus.

These and other objects and advantages will become evident upon reading the following description which, taken with the accompanying drawings, disclose a preferred form of the present invention.

A BRIEF DESCRIPTION OF THE DRAWINGS

A preferred form of the present invention is illustrated in the accompanying drawings, wherein.

DETAILED DESCRIPTION OF A PREFERRED EMBODIMENT

Figures 1, 2, 3:
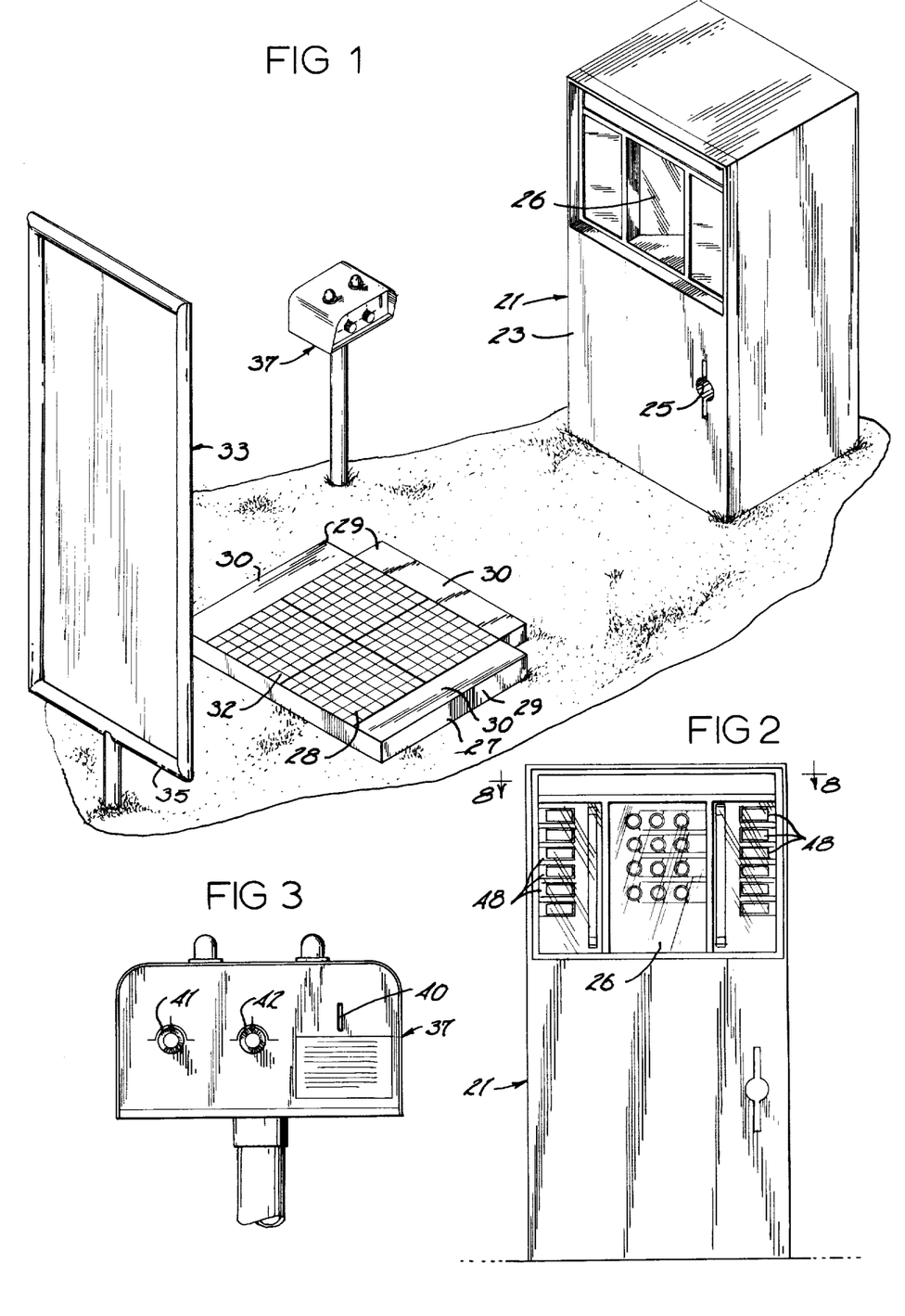
FIG. 1 is a pictorial view of the apparatus of the present invention.
FIG. 2 is a front elevational view of the enclosure of the present apparatus.
FIG. 3 is an elevational view of a control panel and coin slot.

Referring to the drawings and especially to FIG. 1, the apparatus is shown basically comprising a platform 27 and an enclosure 21 facing the platform 27. The enclosure 21 includes a plurality of cameras 46 (FIG. 10) that are operated by a control means for actuating the cameras to sequentially expose a visual aid blank 12 to produce a sequence of independent photographs 14 (FIG. 13) thereon. Each photograph 14 illustrates a specific position assumed by a golfer as he swings a golf club 13. The apparatus also includes a control panel 37 that provides control features that are selectively operable by the user to adjust the apparatus to perform according to his needs.

Figures 4, 5:
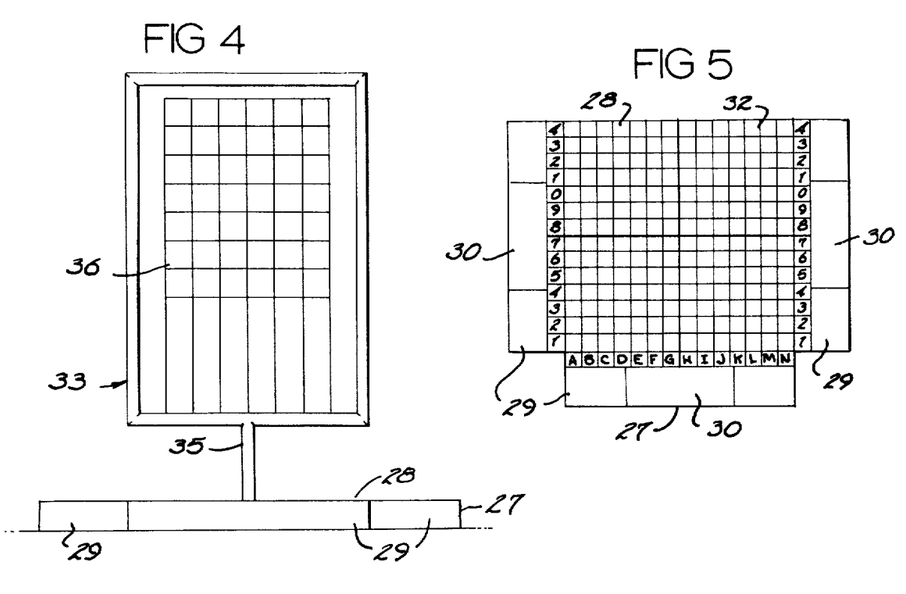
FIG. 4 is an elevational view of the platform and backstop of the present invention.
FIG. 5 is a plan view of the platform.
Figure 13:
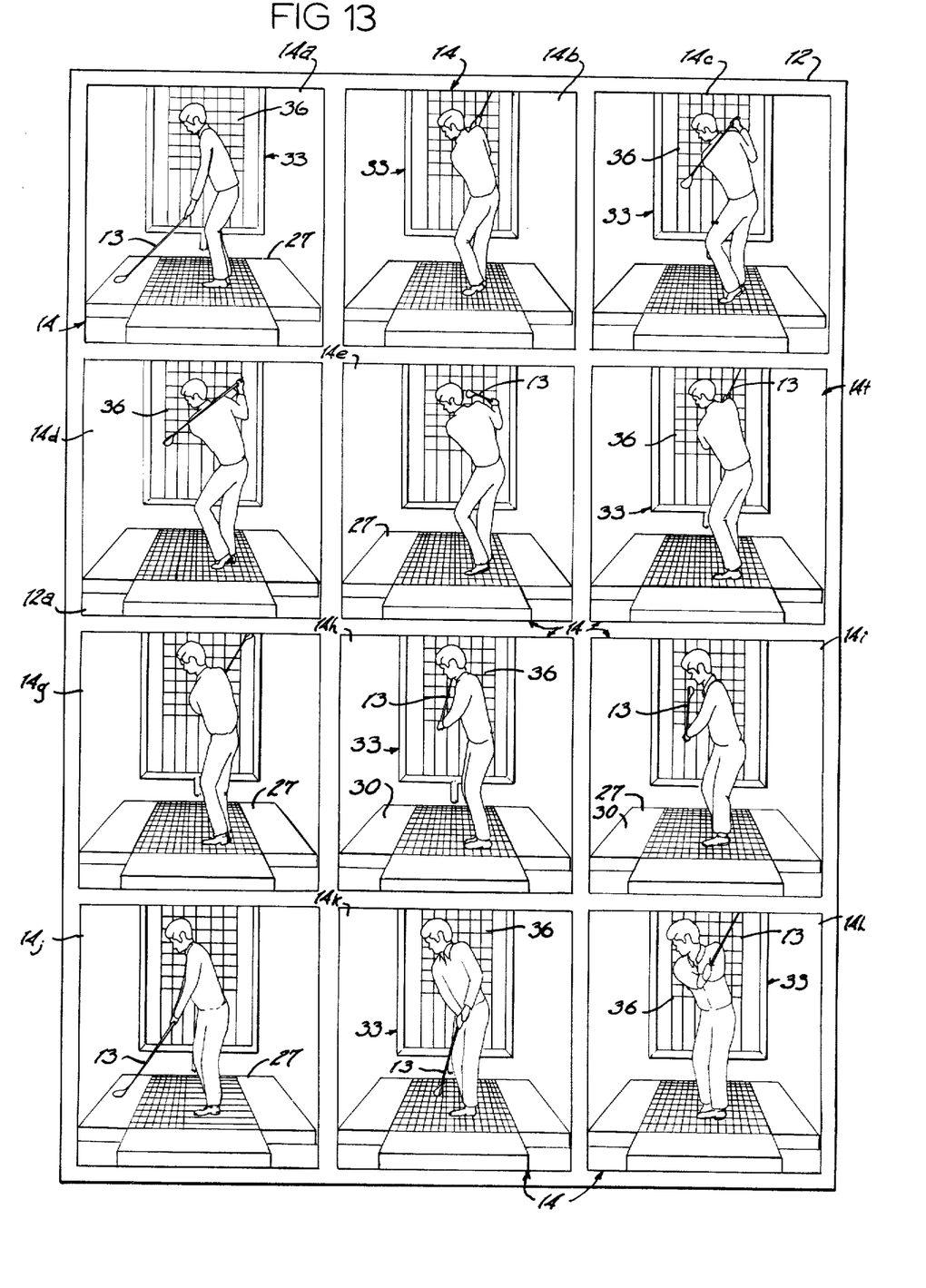
FIG. 13 is a schematic view of a typical visual aid produced by the apparatus of the present invention.

The platform 27 is illustrated in FIGS. 1, 5 and 13. It includes a rectangular reference grid 32 on an upper support surface 28. Platform 27 also includes outwardly protruding extensions 29 that define hitting surfaces 30. The grid 32 may be utilized by the golfer, as illustrated in FIG. 13, to locate his feet at specifically designated positions on the platform 27. A numbering system may be utilized, as illustrated in FIG. 5, to assist in properly positioning the golfer's feet. Each portion of the grid may be located with reference to a specific number and letter combination. The hitting surfaces 30 are arranged on the platform 27 to simulate a "tee" surface whereat an imaginary or simulated golf ball is located to orient the golfer in a prescribed hitting condition relative to the enclosure 21 and the cameras 46 held therein.

As may be noted in FIGS. 1 and 5, three hitting surfaces 30 are arranged on three sides of the platform 27. A golfer utilizing the apparatus may choose any one of the three surfaces to orient himself relative to the cameras 46 so that the resulting visual aid best illustrates his primary areas of concern relative to his golf swing.

A back stop 33 is illustrated in FIGS. 1 and 4 comprising a tubular frame 35 and rectangular grid 36 mounted to the frame 35. Grid 36 is also shown in FIG. 13 to illustrate its use in aiding the golfer to determine relative positions of his upper body throughout the entire photo sequence. The golfer may utilize the grid 36 as it appears in the photographs 14, to detect movement of his head and torso by comparing the individual photos 14. He may also use the grid 36 as an aid in comparing his golf swing to others.

The enclosure 21, as shown in FIGS. 1, 2, 8 and 10, includes a forwardly facing door 23. The door 23 extends the full length of the enclosure to allow access to the interior of the enclosure 21. This allows access for maintenance of the cameras 46 and developing equipment held therein. The cameras 46 are positioned within the enclosure 21 so that their lenses are focused on the platform 27 by way of a mirror 26. Mirror 26 is mounted within the enclosure at an approximate 45° angle relative to the front side of the enclosure 21. The mirror 26 allows the cameras to be safely positioned in the enclosure and not directly facing the platform 27. It also serves to reverse the golfer's image, which is again reversed by the cameras lenses, to produce a positive reproduction on a visual aid blank 12.

The control panel 37 is situated between the enclosure 21 and the platform 27 so it is out of range of the golfer's swing. It includes a coin slot 40, a sensing plate selector switch 42 and a photo sequence time lapse selector switch 41. The sensing plate selector switch 42 enables the golfer to selectively determine which hitting surface 30 he desires to utilize. The time lapse selector switch 41 enables the user to select, from three settings, the total elapsed time from the beginning of the photo sequence to the end. Elements associated with the time lapse selector switch 41 and the sensing plate selector switch 42 will be discussed in greater detail below.

Figure 8:
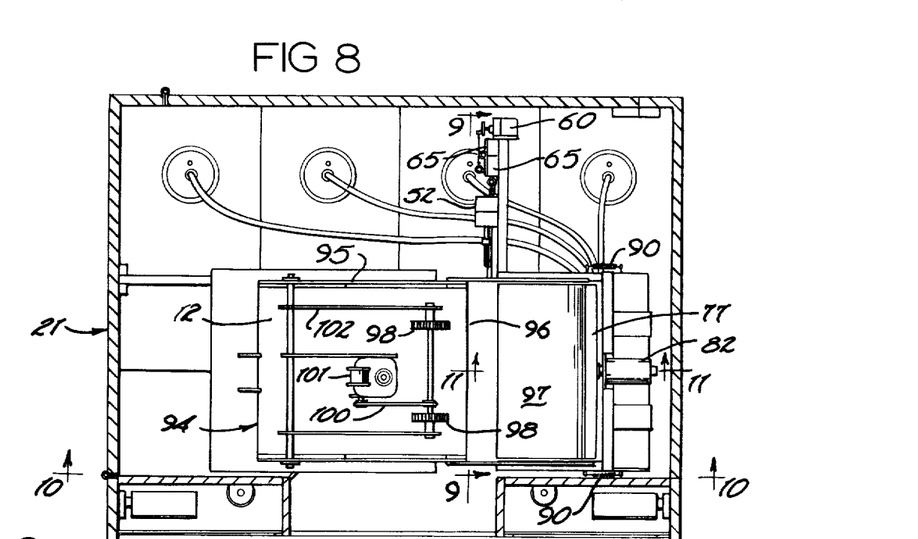
FIG. 8 is a sectioned view taken along line 8—8 in FIG. 2.
Figure 10:
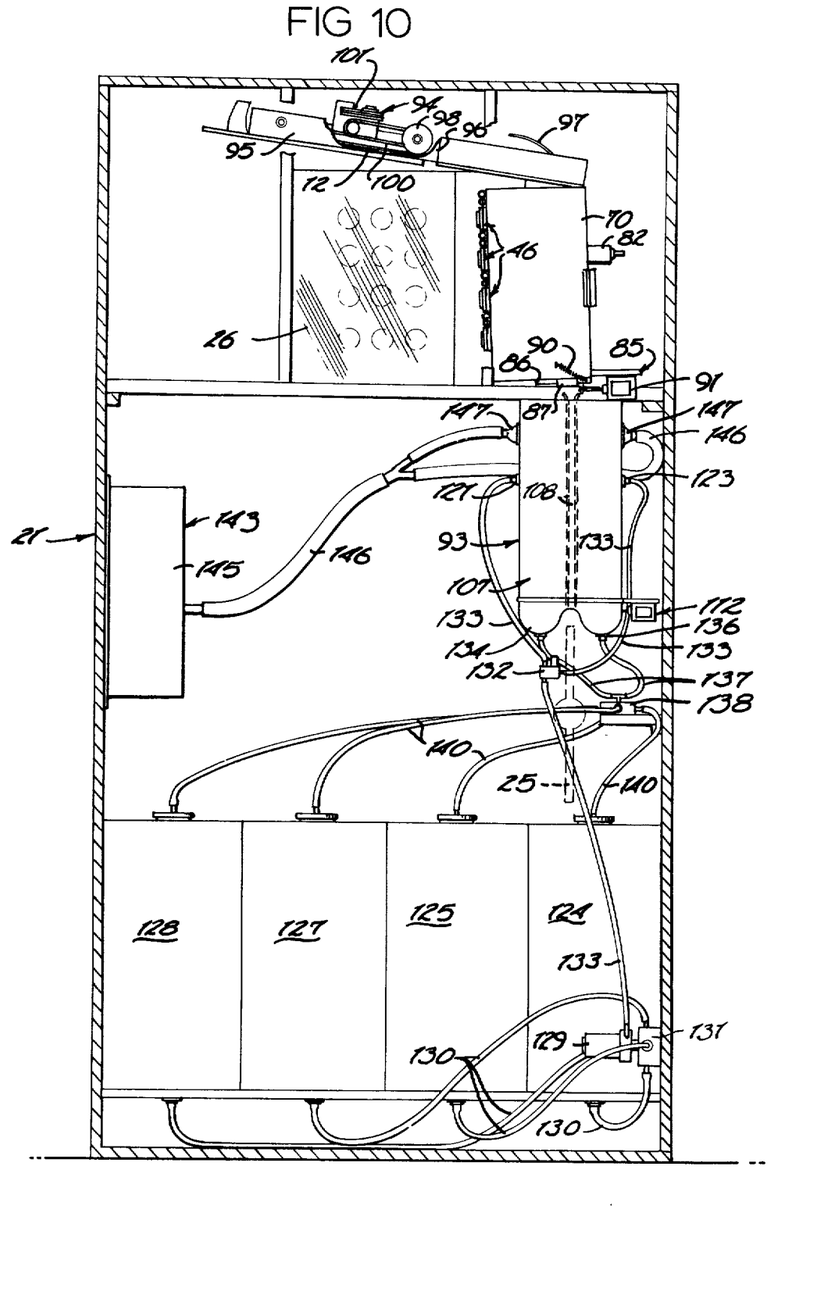
FIG. 10 is a sectioned view taken substantially along line 10—10 in FIG. 8.

Individual visual aid blanks 12 are supplied to the cameras 46 by a feeding means 94 located above the cameras within the enclosure 21 and shown in FIGS. 8 and 10. The feeding means 94 basically includes an upwardly open tray 95 for receiving and supporting a stack of blanks 12 in a substantially horizontal orientation. The tray 95 includes an open end 96 positioned adjacent an exposure chamber 71. The individual blanks 12 are received from the feed means 94 and directed to the exposure chamber 71, by a curved guide plate 97. Guide plate 97 is fixed to an upright plate 77 located at the rear of exposure chamber 71.

Feeding means 94 further includes a pair of friction wheels 98 rotatably carried by a frame 102. The frame 102 is pivotably mounted to the tray 95. Wheels 98 are powered to rotate by a motor 101 and drive belt 100. The motor 101 and drive belt 100 power the friction wheels 98 to rotate in a counterclockwise direction, as seen in FIG. 10, so the wheel surfaces will engage and move the top blank 12 of the stack toward the guide plate 97. Motor 101 is also mounted to the frame 102 so the complete assembly, including motor 101 and friction wheel 98, may be pivoted upwardly or downwardly. This free pivotal movement allows friction wheels 98 to remain in continuous engagement with the top blank on the stack as its thickness decreases. Feed means 94 is automatically operated to supply a single blank 12 to the cameras 46 upon insertion of a coin or token into the coin slot 40 of the control panel 37.

Figure 9:
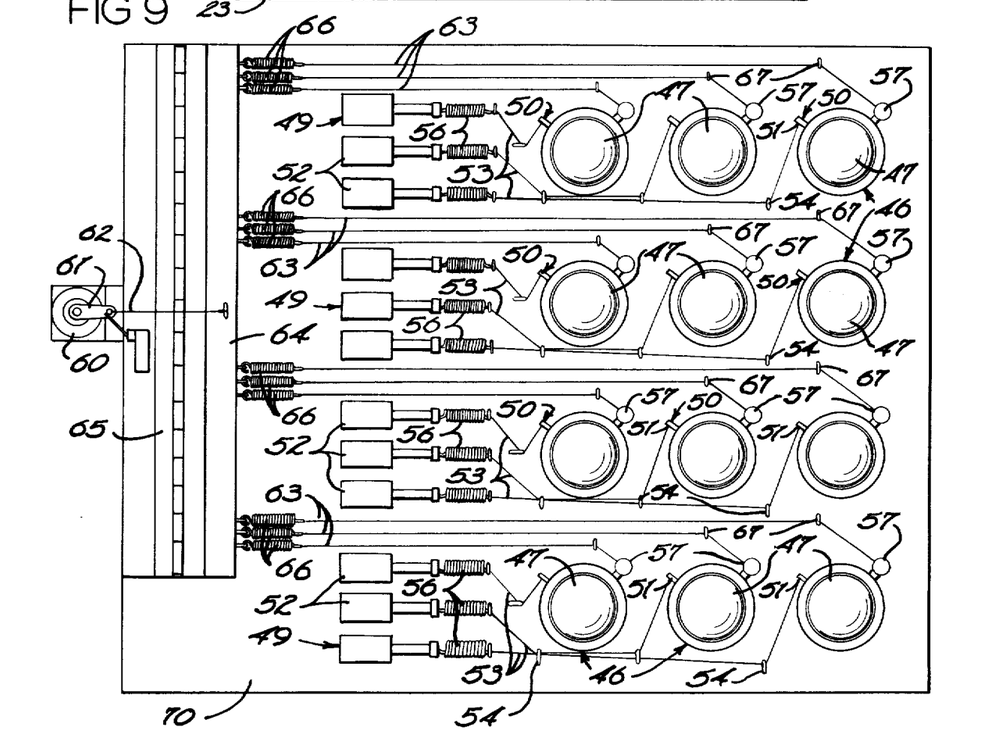
FIG. 9 is an elevational view taken substantially along line 9—9 in FIG. 8.
Figures 11, 12:
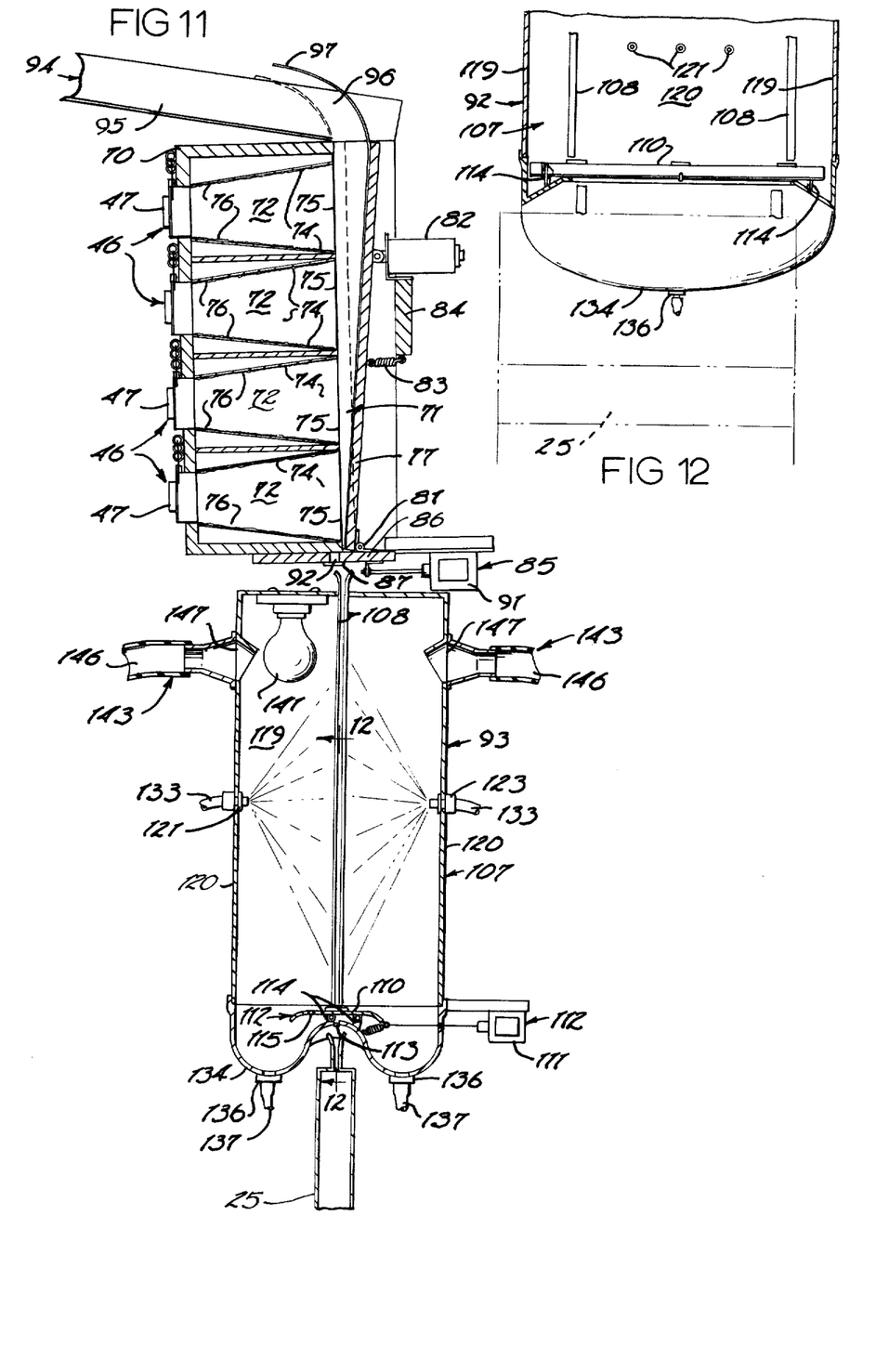
FIG. 11 is a sectioned view taken substantially along line 11—11 in FIG. 8.
FIG. 12 is a reduced sectioned view taken substantially along line 12—12 in FIG. 11.

The cameras 46 are illustrated in FIGS. 9, 10 and 11. They include a plurality of conventional camera lenses 47 arranged in a rectangular array. There are twelve such lenses 47 illustrated in the drawings for exposing different areas of the photo sensitive surface of the visual aid blanks 12 to produce a permanent visual aid thereon. Each lens is equipped with a shutter assembly 50 that is operated by a shutter release lever 51. In the preferred form of the present invention, each shutter release lever 51 is operated by a shutter operating means 49, comprising a solenoid 52 (FIG. 9) and a wire 53 extending from the solenoid plunger through appropriate guide eyelets 54 to the shutter release levers 51. Tension springs 56 are included between each wire 53 and solenoid 52 to act as shock absorbers, preventing damage to the shutters and shutter release levers resulting from improper tension of the wires 53.

The shutters and lenses 50, 47 are each operatively connected to conventional flash strobes 48 (FIG. 2) that are automatically operated to flash as the shutters are released. Such shutters and strobe assemblies are well known, commercially available items and will not be described in greater detail.

The shutters 50 must be mechanically reset after each exposure sequence. This is accomplished by operation of a shutter reset lever 57 supplied on each lens and shutter assembly. The reset levers 57 are operated in unison to reset the shutters by a reset motor 60. The reset motor 60 rotates a crank 61 which mounts a connector wire 62 at its outer end. The other end of the connector wire 62 is mounted to a pivotable hinge plate 64. The hinge plate 64 is movable about the axis of a hinge 65 in response to rotational movement of crank 61. Hinge plate 64 is connected to the shutter reset levers 57 by a set of connector wires 63 and a set of tension springs 66. Wires 63 extend from the springs 66 through guide eyelets 67 to connect the reset lever 57. As the motor 60 rotates crank 61, the hinge plate 64 is pivoted outwardly, pulling the reset levers back to reset the shutters 50. Springs 66 are utilized, as are tension springs 56, to act as shock absorbers and to eliminate the necessity for determining the exact length of the wire 63 required to move the reset levers 57 to reset the shutters. They also function to return the plate 64 a reset position after operation of motor 60. Operation of the reset motor 60 is controlled by a limit switch 68 that allows a single revolution of the crank 61 per operational cycle of the apparatus.

The solenoids 52 are operated to release the camera shutters 50 in a predetermined sequence over a period of time so that a series of "stop action" photographs are taken of the golfer. The sequence includes the complete golf swing starting with the golfer's back swing, his down swing and finally the follow-through. FIG. 13 illustrates the sequence in greater detail with the golfer's back swing illustrated in photos 14a, 14b, 14c and 14d wherein the golfer's club 13 is drawn upward and rearward of the selected hitting surface 30. The down swing motion is illustrated in photos 14e, 14f, 14g, 14h, 14i and 14j, wherein the club 13 is moved sequentially forward and downwardly toward the hitting surface and an imaginary or simulated golf ball thereon. Finally, the follow through motion is shown in photos 14k and 14l, with the club 13 continuing forwardly, but upwardly and away from the hitting surface 30. As may be noted from 14a, the photo sequence is initiated as the golfer starts his back swing motion, moving the club head away from the hitting surface 30.

Figure 6:
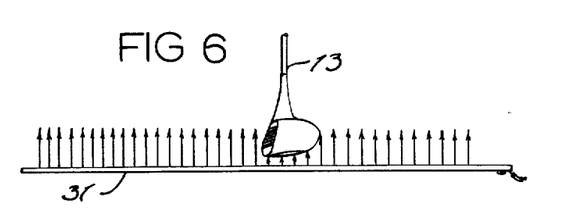
FIGS. 6 and 7 are diagrammatic views illustrating the operation of a proximity detector in relation to movement of a golf club head.
Figure 7:
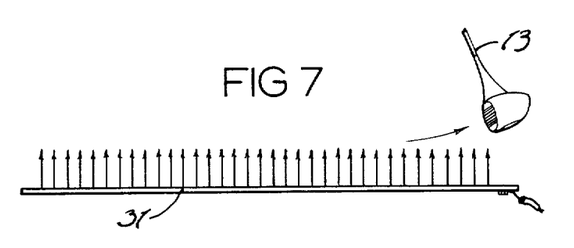

A control means 55 (FIG. 14) is utilized to automatically initiate the photo sequence in response to movement of the golf club head away from the hitting surface. The control means 55 comprises a proximity detector unit 152 (FIG. 14) and a selected sensing plate 31 (FIGS. 6 and 7). The detector unit 152 is located within control panel 37 and is utilized to receive and transmit signals from the selected sensing plate 31 as the gold club head is moved toward and away from the hitting surface. Operation of the proximity detector is graphically illustrated in FIGS. 6 and 7, wherein the club head changes the capacitance (indicated by vertical arrows) of a detector unit circuit as it is brought into close proximity of the sensing plate 31. This change in capacitance arms the detector unit 152. When the club head is subsequently removed from the area of the sensing plate (FIG. 7), the capacitance is changed back to a normal level. This change is then transferred by the detector unit as a signal to the shutter operating means 49 to initiate the photo sequence.

The shutter operating means 49 is initially activated to sequentially release the shutters over a prescribed period of time by the control means 55. This sequence is determined by a plurality of conventional time delay relays (not shown) wired to the solenoids 52. The first exposure, however, is taken immediately as the signal from the proximity detector unit 152 is received by a solenoid 52 which operates a shutter 50 to expose or project a latent image of the golfer onto the area of the blank 12 associated with photo 14a. The same signal simultaneously activates the first time delay relay (not shown). This relay first activates the next successive relay, then after a set time interval, activates the next successive solenoid 52 to release a shutter 50 to expose the area of blank 12 that will produce the second photo 14b. This process continues from relay to relay until the final exposure is completed.

The delay relays mentioned above are a conventional item supplied by many electrical component retailers. Such relays are used to delay or hasten the release of an associated shutter after receiving an impulse from a previous relay. We have found by providing means for adjusting the relay controlling the elapsed time between the second and third exposure (Photos 14b and 14c) that the total elapsed time of the exposure sequence may be adapted to suit almost any golfer's swing speed. The photo sequence time lapse selector switch 41 provided on the control panel 37 enables the golfer to set an associated time delay relay so the total elapsed time of the exposure sequence will conform closely to his individual swing speed. Switch 41 may be selectively moved to three different positions labeled accordingly for a slow, medium, or fast back swing.

As shown in FIG. 11, cameras 46 are held within a light proof box 70. The box 70 includes rearward exposure chamber 71 that is designed to receive and position individual visual aid blanks 12 in prescribed focal plane relative to the lenses 47. Each camera includes an individual lightproof compartment 72 formed of side walls 74. The side walls 74 diverge outwardly toward open ends 75. Open ends 75 are aligned along a common plane adjacent the exposure chamber 71 to define the focal plane for lenses 47. The walls 74 are lined with a black felt material 76 to reduce reflection of light onto the blank 12, from the side walls 74.

The visual aid blanks utilized by the present invention are rectangular in configuration, as illustrated in FIG. 13 with each individual aid blank including planar photo-sensitized surface 12a having an aerial dimension greater than the total area occupied by the open ends 75 of compartments 72. The size of the blank enables the cameras 46 to project separate latent images of the golfer onto different areas of the blank, thereby producing an individual photograph 14 for each camera 46. The open ends 75 also define margin spaces between the individual photographs 14 as shown in FIG. 13.

Open ends 75 of the lightproof compartments 72 comprise one side of the exposure chamber 71. The other side of chamber 71 is defined by the upright plate 77. Plate 77 is mounted to a slidable plate 86 of a release means which will be described in greater detail below. A hinge 81 mounts the upright plate 77 to plate 86 for pivotal movement about its hinge axis. Movement of the plate 77 is controlled by a solenoid 82 and return springs 83. Solenoid 82 and spring 83 are connected between the upright plate 77 and a relatively stationary cross member 84 extending across the lightproof box 70. The spring 83 and solenoid 82 facilitate movement of the upright plate 77 between an inoperative and an operative position. The inoperation position is illustrated in FIG. 11 by solid lines with the chamber 71 set to receive a blank 12 from the feed means 94. In the operative position, the plate 77 is urged by the solenoid 82 against the open ends of compartments 72 to tightly hold the blank against the open ends 75 and thereby locate the photo-sensitized surface 12a along the focal plane. The operative position of plate 77 is illustrated in FIG. 11 by dashed lines. Operation of the solenoid 82 moves the plate to the operative position while the tension spring 83 is utilized to return the plate 77 to the inoperative position.

The visual aid blank 12 is released, after being exposed, by operation of a release means 85 basically illustrated in FIG. 11. Release means 85 includes the slidable plate 86 that is connected by brackets 87 to the bottom of lightproof box 70. Brackets 87 allow translational movement of the slidable plate 86 along a substantially horizontal plane. The plate 86 is also movable between an operative and inoperative position by means of a solenoid 91 and a pair of return springs. 90. The solenoid 91 is best illustrated in FIG. 11 while the return springs 90 are shown in FIGS. 8 and 10. The inoperative position of plate 86 is illustrated in FIG. 11 where the flat upper surface of the plate 86 is positioned directly below the exposure chamber 71. The photosensitized visual aid blank 12, held within the chamber 71 rests against this surface prior to and during the exposure sequence. The solenoid 91 is utilized to move the plate 86 to an operative position wherein an elongated slot 92 is aligned with the blank held within the exposure chamber. Since the upright plate 77 is connected by hinge 81 to the slidable plate 86, it is also moved to a position away from the open ends of compartment 72 and clear of the exposed blank 12 held therein. The slot 92 allows the exposed blank 12 to fall gravitationally from the exposure chamber directly into a developing means 93 located below.

The developing means 93 includes a developing section including a developing tank 107 mounted within the enclosure 21 directly below the exposure chamber 71. The tank 107 includes upright guides 108 that extend upwardly from the tank to guide the blank 12 into the tank as it falls gravitationally from the exposure chamber 71. The guides 108 direct the blank to a support table 110 within the developing tank 107. The support table 110 is an element of a final visual aid release means 112 that will be discussed in greater detail below.

The developing tank 107 is comprised of upright side walls 120 and end walls 119. Side walls 120 support spray nozzles 121 and 123 which are utilized to sequentially spray developing chemicals and water rinse onto the exposed blank 12 held on table 110. Spray nozzles 121 are elements of a processing chemical supply means for sequentially applying developing chemicals to the exposed blank 12. The nozzles 121 are utilized for spraying processing chemicals and water onto the exposed photo-sensitive surface 12a of the blank 12. Both sets of nozzles 123 and 121 are utilized to spray a water wash over both sides of blank 12 after each application of processing chemicals, in order that chemical residue may be completely removed from both surfaces of the blank 12.

The spray nozzles 121 receive several different chemicals in sequence from a series of supply tanks, including a developer storage tank 124, a bleach storage tank 125, a clearing solution storage tank 127, and a water storage tank 128. The nozzles 121 receive these chemicals from respective storage tanks through supply hoses 130 leading from each individual tank to a four-way solenoid operated valve 131. Valve 131 is operated to allow only one chemical to pass through a pump 129 and common delivery tubes 133 to the spray nozzles 123 and/or spray nozzles 121 is controlled by a second solenoid valve 132. Valve 132 is connected to the delivery tubes 133 and is operated to supply both nozzles 121 and 123 only when a water wash is utilized.

The four-way solenoid operated valve 131 is utilized to supply the chemicals and water to pump 129 in a prescribed sequence by a developing sequence control 168 (FIG. 14) so the exposed blank 12 may be properly processed. Valve 131 is first operated to connect the common delivery tubes 133 to the developer storage tank 124. The valve is held open to allow developer to flow through the pump 129 for a prescribed interval of time, as determind by a preset time delay relay (not shown). During this time, the developer flows onto the exposed surface 12a and downwardly into the bottom portion of the developing tank which is utilized as a drain sump 134.

A pair of drain outlets 136 are provided at the lowest portion of drain sump 134 and are connected by a pair of primary drain hoses 137 to an additional four-way solenoid operated valve 138. Independent return hoses 140 are connected between the second solenoid operated valve 138 and respective storage tanks 124-128. Thus, the developer will drain from the photo-sensitive surface of the blank, through the drain outlets 136 and into the primary drain hoses 137. The four-way solenoid operated valve 138 is automatically controlled to direct the developer back through its respective return hose 140 to the developer storage tank 134.

The water rinse is utilized between successive applications of chemicals to clear the chemical residue from the sensitized surface 12a. Water supplied by storage tank 128 for the wash cycles is delivered through its individual supply hose 130 to the first solenoid operated valve 131. Valve 131 is automatically activated to connect the water to the common supply hoses 133 leading between the valve 131 and the spray nozzles 121 and 123. Solenoid valve 132 is also automatically operated during the wash cycle to allow both sets of nozzles 121 and 123 to be utilized to thoroughly wash both sides of the exposed blank. It may be noted that by using alternating wash cycles, the common supply hoses 133 are also cleaned of the chemical residue before passage of the next successive chemical therethrough.

The duration of the water wash cycles is regulated by a conventional time delay relay. The second four-way solenoid operated valve 138 is operated to drain the water back into the water storage tank 128 during each wash cycle and for a short period of time thereafter. It may be noted that it is not entirely necessary that water be supplied from a separate storage tank and that it could be supplied as well from an ordinary supply source and be subsequently drained away and not recycled.

A bleaching agent supplied by storage tank 125 is the next chemical supplied in sequence following the developer and wash. The bleaching agent is sprayed onto the sensitized surface 12a for a prescribed period of time after which the wash cycle is again repeated to clean the bleach residue from the surface 12a and to clear the common supply lines 133.

The next successive step in the processing sequence is the application of a clear bath through nozzles 121 to the surface 12a. As the clearing agent is drained back into its storage tank 127, a re-exposure light 141 is operated to re-expose the sensitized surface 12a to direct light. The re-exposure light 141 is also operated by a time delay relay to re-expose the blank over a specific period of time. Once this exposure is completed, a second application of developer is applied to the blank and, after the developer has drained back into its respective storage tank 124, the water wash cycle is again repeated before the next successive development cycle. After this final wash the developing stage is complete, the latent images projected by the lenses onto blank 12 being transformed into a finished visual aid.

The finished visual aid sheet 12 will retain moisture from the chemicals and water wash after the processing operation. This moisture is evaporated by a drying system 143 which comprises an air blower 145 mounted within the enclosure 21. The blower 145 includes air supply hoses 146 leading from the blower to vents 147 provided on opposite sides of the developing tank 107. Dry air is directed through the vents by blower 145 against both surfaces of the visual aid blank 12.

Once the developing and drying cycle is complete, the final release means 112 is operated to allow the blank 12 to fall gravitationally to an access slot 25 provided in the front of enclosure 21. Release means 112 includes the support table 110 described above. The support table 110 is connected by pivot arms 114 to the developing tank 107. It includes an elongated slot 115 (FIG. 11) which, in an inoperative position, is located to one side of the developed training aid blank presently resting thereon. The support table 110 is translationally movable to an operative position wherein the slot 115 is aligned with the developed blank 12. This is accomplished by a solenoid 111 mounted to a side wall 120 of tank 107.

A lower release slot 113 is provided in the developing tank 107 directly below the blank. Slot 113 is positioned so the blank will fall gravitationally from the tank as the support table 110 is moved to the operative position. Slot 113 is also aligned with a blank receiving opening of the acess slot 25. The golfer may remove the blank from the slot in order that he may study and analyze his golf swing, photographically presented thereon substantially as shown in FIG. 13.

Figure 14:
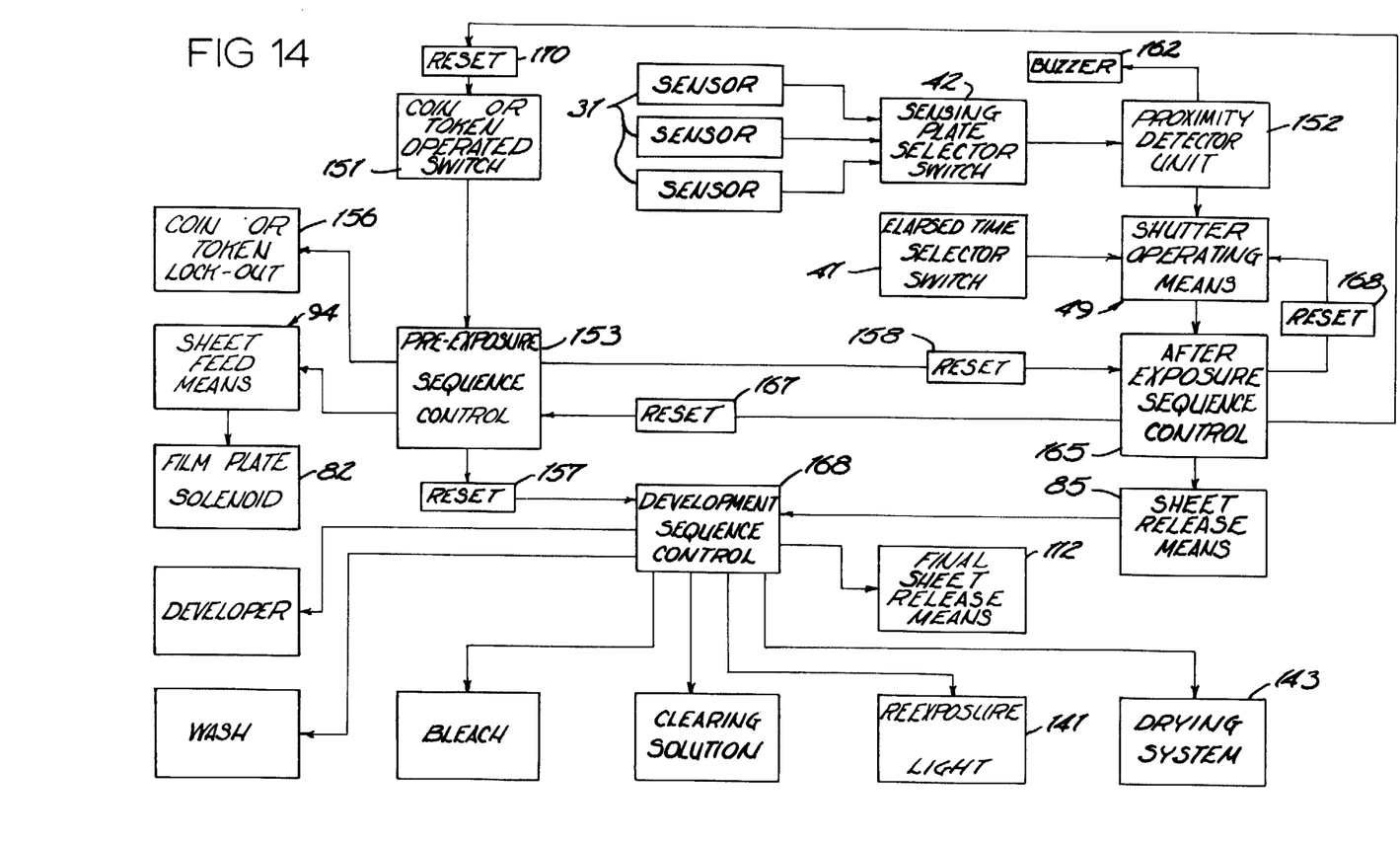
FIG. 14 is a block diagram illustrating the operation and control of the present invention.

The operation and control system of the apparatus described above may be understood with reference to the block diagram illustrated in FIG. 14. The golfer may insert a coin into slot 40 after he first selects a desired hitting surface 30 by operating the sensing plate selector switch 42. Switch 42 is a three-position switch that enables the golfer to activate any one of three sensing plates 31 located below each of the hitting surfaces 30. The selected sensing plate 31 is thereby connected to the proximity detecting unit 152 as described above. The activated plate 31 will send signals through the proximity detector unit 152 as the golfer's club head moves into and away from the vicinity of the selected sensing plate 31.

The golfer is also able to adjust the photo sequence time lapse selector switch 41 to any one of the three positions described to accommodate his swing speed. The selector switch 41 functions to shorten or lengthen the elapsed time between the second and third exposures in the sequence of twelve.

After selecting a desired hitting surface 30 and a sequence speed comparable to the length of his swing, the golfer may then insert a coin or token into slot 40 of control panel 37. The coin activates a coin slot switch 151 that in turn activates a pre-photo sequence control 153. Control 153 initiates a series of steps to ready the apparatus for the following operational sequence. A coin lockout mechanism 156 is actuated by the sequence control 153 to prevent additional coins or tokens to be inserted in the coin slot 40.

The pre-photo sequence control 153 also activates feeding means 94 to supply a blank 12 to the exposure chamber 71. Sequence control 153 also operates a development system reset 157 and an after exposure control reset 158. During operation of the pre-photo sequence control 153, the proximity detector circuit is opened, awaiting a signal from the selected sensor plate 31 before activating the shutter operating means 49.

The golfer steps onto the platform 27 facing the selected hitting surface after inserting a coin or token. He arranges his feet on the grid 32 and brings his golf club head into close proximity of the hitting surface 30 and selected sensing plate 31. The then activated sensing plate 31 sends a signal to the proximity detector unit 152. For response, the detector unit 152 operates a warning buzzer 162, indicating to the golfer that the proximity detector circuit is armed and will activate the shutter operating means 49 as the golf club head is removed from the sensing field of the sensing plate 31. The club head is removed from the field as the golfer initiates his back swing.

The total elapsed time involved in the shutter release sequence covers a time period of about 2 seconds, wherein each of the 12 shutters 50 are operated in sequence to expose the blank 12 held within the exposure chamber 71.

Once the blank has been exposed, an after exposure sequence control 165 is activated to initiate the remaining steps necessary to complete processing of the blank and to reset the apparatus for the next successive operational cycle.

The first step in the after exposure sequence is operation of the blank release means 85 in order that the blank may fall into the developing tank 107. As the blank reaches the support table 110, the development sequence control 168 is activated to sequentially control the operation of the pump 129 and the solenoid operated valves 131, 132, and 138. The after exposure sequence control 165 also operates a pre-photo sequence reset 167, a shutter reset 168, and a coin switch reset 170.

The development sequence control 168 sequentially operates the pump 129 and valves 131, 132, and 138 to first supply developer from the developer storage tank 124 to the sensitized surface 12a of the exposed blank 12. The developer is then drained away and a wash is applied to both sides of the blank from the water storage tank 128. Bleach is then applied to the exposed surface 12a from the bleach storage tank 125. The wash is applied after the bleach to again wash away the chemical residue and clean the common supply hoses 133. The development sequence control 168 next operates pump 129 and valve 131 to apply the clearing agent from the clearing supply tank 127 to the surface 12a. After this step, the surface is re-exposed by operation of re-exposure light 141. The blank 12 is then washed again and a second application of developer is applied to the exposed surface 12a, drained, and finally a subsequent wash cycle is utilized to clear the residue from the hoses 133 and completely clean the now developed visual aid. Drying system 143 is then operated over a predetermined period of time to completely dry both surfaces of the developed aid. It is released as the final sheet release means 112 is operated to allow the blank to fall gravitationally into the access slot 25.

The series of photographs 14 comprising the visual aid utilized by the golfer or his instructor to detect errors or weaknesses of his golf swing. For example, the golfer diagrammatically shown in FIG. 13 could detect, by comparing the photos 14, that his head moves both vertically and horizontally in relation to the back stop grid 36 during his down swing and follow through. This is undersirable, since it is well known that a golfer's head should remain as stationary as possible throughout his entire swing. It is also possible to detect other errors that would not become clearly evident without analyzing the individual photographs relative to one another. Errors such as improper stance, improper hand grip, poor weight distribution, unnecessary movement of the hips, knees, shoulders, and arms may be easily detected by studying and analyzing the visual aid. Once the golfer is aware of these errors, he may correct them through practice or the aid of an instructor.

It may have become evident from the above description and the attached drawings that various changes and modifications may be made therein without departing from the intended scope of the present invention. Therefore, only the following claims are to be taken as definitions of the invention.

What we claim is:

1. A golf teaching aid apparatus for assisting a golfer in analyzing and improving his golf swing, comprising:
   a platform for supporting a golfer;
   a hitting surface on said platform simulating the location of a golf gall and the intended direction of flight of the golf ball, to orient the golfer in prescribed hitting condition as he swings a golf club from a backswing movement, rearward and upward from the hitting surface, a down swing movement forward and downward toward the hitting surface, and a follow-through movement forward and upward from the hitting surface;
   an enclosure facing the platform;
   a plurality of cameras having lenses and shutter assemblies arranged in a rectangular array within the enclosure wherein each assembly has a separately operable shutter;
   said plurality of cameras having a common exposure chamber spaced from the lenses defining a focal plane common to the lenses where separate images are focused by the lenses, said images being separated over a prescribed rectangular area;
   shutter operating means for sequentially operating the shutters over a desired time interval;
   a visual aid blank having dimensions complementary to those of the exposure chamber and having a photo-sensitive surface thereon of areal dimension exceeding said prescribed rectangular area;
   means for feeding the visual aid blank to the exposure chamber;
   a mirror situated within the enclosure for reversing the image of a golfer on said platform to the cameras thereby enabling the cameras to project a direct positive image of the golfer onto the photo-sensitized surface of the visual aid blank feed to the exposure chamber;
   control means responsive to movement of the golf club head from the hitting surface during an initial portion of the back swing to activate the shutter operating means to sequentially project positive images of the golfer onto different areas of the photosensitive surface to form a plurality of positive latent images thereon during the golfer's back swing, down swing and follow through;
   means for releasing the exposed visual aid blank from the exposure chamber and transferring it to a developing section contained within the enclosure;
   means for developing the exposed visual aid blank in the developing section; and
   means for presenting the developed visual aid blank for access by the golfer.

2. The apparatus set out in claim 1 wherein the platform is comprised of:
   a horizontal support surface;
   a reference grid located on the support surface enabling the golfer to locate his feet on the platform at specific positions; and
   wherein the hitting surface is comprised of a portion of the support surface extending outwardly from the reference grid.

3. The apparatus defined in claim 1 wherein the cameras are held within a lightproof compartment with each lens being associated with an individual lightproof compartment;
   said compartments having open ends facing said exposure chamber so as to form one side of said exposure chamber;
   said exposure chamber further including an upright plate adjacent the open ends of said lightproof compartments, said plate being supported for movement between an operative position, wherein the photo-sensitized surface of said visual aid blank held within the exposure chamber is urged against the open ends of the lightproof compartments, and an inoperative position, spaced from the open ends of the lightproof compartments.

4. The apparatus set out in claim 3 wherein the lightproof compartments are lined with a dark colored felt material.

5. The apparatus set out in claim 1 wherein the shutter operating means is adjustable to facilitate separate adjustment of the time elapse between actuation of said shutters.

6. The apparatus set out in claim 1 wherein the means for feeding a visual aid blank to the exposure chamber comprises:
   an upwardly open rectangular tray having an open end adjacent an upper end of the exposure chamber for receiving a stack of said visual aid blanks therein in a substantially horizontal orientation;
   a friction wheel operatively connected to the tray and positioned therein to engage the top surface of the top blank in the stack;
   drive means for selectively rotating the friction wheel to thereby slide the engaged blank off the stack; and
   a guide plate for guiding the blank gravitationally into the exposure chamber.

7. The system set out in claim 1 wherein the control means includes an electronic proximity detector for detecting the presence of a golf club head adjacent a sensing plate located beneath the hitting surface wherein the proximity detector is operable upon motion of the club head away from the sensing plate to activate the shutter operating means to release the camera shutters over the desired time interval.

8. The apparatus set out in claim 1 wherein the release means comprises a slidable plate movably supported below the cameras, the plate having an elongated slot formed therethrough;
   said slidable plate being movable between an inoperative position wherein a blank presently in said exposure chamber rests on said plate and an operative position wherein the slot is moved into alignment with the blank, thereby allowing the blank to fall freely therethrough.

9. The system set out in claim 8 wherein the upright plate is pivotably mounted to the slidable plate.

10. The apparatus set out in claim 1 wherein the developing means includes an upright developing tank located within the enclosure below the exposure chamber;

said tank having an upper opening facing the exposure chamber, and elongated paper guides extending from the opening toward the exposure chamber for receiving and guiding the exposed visual aid blank into the developing tank as it falls gravitationally from the exposure chamber in response to operation of said release means.

11. The apparatus as set out in claim 10 wherein said developing means further includes processing chemical supply means for sequentially applying developing chemicals to the exposed photo sensitive surface of the visual aid blank held within the developing tank.

12. The apparatus set out in claim 11 wherein the processing chemical supply means comprises:
   an individual storage tank located within the enclosure below the developing tank for each chemical;
   a pump;
   a supply hose leading from each tank to the pump;
   valve means located between the supply hoses and the pump selectively operable to permit passage of the chemicals separately and in a prescribed sequence through said pump;
   a delivery hose extending from the pump to the developing tank;
   a spray nozzle connected to the delivery hose and extending into the developing tank toward the visual aid blank held therein for directing the chemicals against the exposed sensitized surface of the blank; and
   chemical recovery means connecting the developing tank and the chemical storage tank for recovering chemical sprayed onto the exposed surface and for recycling the chemicals back to their respective storage tanks.

13. The apparatus set out in claim 12 wherein the chemical recovery means comprises:
   a drain tube mounted to a lower end of a developing tank;
   a chemical return hose leading from each chemical storage tank; and
   drain valve means interconnecting the drain tube and the return hoses, operable to route each chemical received from the drain tube through its individual return tube and thus back to its respective storage tank.

14. The apparatus set out in claim 11 wherein the developing means further includes a re-exposure light located within the developing tank operable to re-expose the photo-sensitized surface.

15. The apparatus set out in claim 11 further including drying means for drying the visual aid blank after it has been developed.

16. The apparatus set out in claim 15 wherein the drying means includes an air blower connected to the developing tank by an air hose, said air hose being mounted to the developing tank adjacent to a visual aid blank therein to direct an air current across the blank.

17. The apparatus set out in claim 1 wherein the means for presenting the developed visual aid blank for access by the golfer comprises:
   an elongated plate movably mounted within the developing tank, for initially supporting the blank;
   an elongated slot in said plate;
   an elongated slot formed through the bottom of the developing tank below the elongated plate and directly below the visual aid blank supported on the elongated plate;
   drive means for moving the elongated plate between an inoperative position, wherein the elongated slot is vertically offset from the elongated slot in the developing tank, and an operative position, wherein the slot is aligned with the slot in the developing tank, whereby the visual aid blank is free to fall gravitationally through the aligned slot; and
   an access slot formed in the enclosure directly below the developing tank for receiving the developed visual aid blank, having an outwardly facing opening to allow access to the said blank by the golfer.

* * * * *